US012620754B2

(12) United States Patent
Yadine et al.

(10) Patent No.: US 12,620,754 B2
(45) Date of Patent: May 5, 2026

(54) CONNECTOR REAR COVER, CONNECTOR SYSTEM, AND ASSEMBLY METHOD

(71) Applicant: Tyco Electronics France SAS, Pontoise (FR)

(72) Inventors: Naoufal Yadine, Pontoise (FR); Francois Jodon De Villeroche, Pontoise (FR)

(73) Assignee: TE Connectivity Solutions GmbH, Schaffhausen (CH)

( * ) Notice: Subject to any disclaimer, the term of this patent is extended or adjusted under 35 U.S.C. 154(b) by 363 days.

(21) Appl. No.: 18/345,110

(22) Filed: Jun. 30, 2023

(65) Prior Publication Data

US 2024/0006802 A1 Jan. 4, 2024

(30) Foreign Application Priority Data

Jul. 4, 2022 (FR) ...................................... 2206738

(51) Int. Cl.
*H01R 13/52* (2006.01)
*H01R 13/50* (2006.01)
(Continued)

(52) U.S. Cl.
CPC ....... *H01R 13/5208* (2013.01); *H01R 13/501* (2013.01); *H01R 13/506* (2013.01); *H01R 43/20* (2013.01)

(58) Field of Classification Search
CPC .................................................. H01R 13/5208
See application file for complete search history.

(56) References Cited

U.S. PATENT DOCUMENTS 5,586,916 A 12/1996 Shinji et al.
5,601,449 A 2/1997 Yasuhisa et al.
(Continued)

FOREIGN PATENT DOCUMENTS

EP 0549269 A1 6/1993
JP H07122330 A 5/1995
(Continued)

OTHER PUBLICATIONS

Korean Office Action dated Mar. 21, 2025 with English translation, corresponding to Application No. 10-2023-0085771, 22 pages.
(Continued)

*Primary Examiner* — Oscar C Jimenez
(74) *Attorney, Agent, or Firm* — Barley Snyder

(57) ABSTRACT

A connector rear cover includes a middle portion having a first edge and a second edge, a first lateral portion having a first lateral edge, and a second lateral portion having a second lateral edge. The first lateral portion is connected to the middle portion by a first hinge and the second lateral portion is connected to the middle portion by a second hinge so that the connector rear cover is foldable between an open and a closed state. The first edge of the middle portion faces the first lateral edge of the first lateral portion and the second edge of the middle portion faces the second lateral edge of the second lateral portion. The edges have recesses such that, in the closed state, there are openings between the middle portion and the first lateral portion and between the middle portion and the second lateral portion that receive electric conductors.

20 Claims, 8 Drawing Sheets

(51) Int. Cl.
*H01R 13/506* (2006.01)
*H01R 43/20* (2006.01)

(56) References Cited

U.S. PATENT DOCUMENTS

| | | | | |
|---|---|---|---|---|
| 6,030,252 | A | 2/2000 | Oda et al. | |
| 8,328,572 | B2 * | 12/2012 | Tashiro | H01R 13/506<br>439/271 |
| 9,755,350 | B2 | 9/2017 | Yamada | |
| 2009/0197450 | A1 * | 8/2009 | Ooki | H01R 13/5208<br>439/271 |
| 2016/0240957 | A1 | 8/2016 | Ludwig et al. | |
| 2017/0110218 | A1 | 4/2017 | Wakabayashi et al. | |
| 2024/0243512 | A1 * | 7/2024 | Nito | H01R 13/508 |

FOREIGN PATENT DOCUMENTS

| | | | |
|---|---|---|---|
| JP | 2013187060 | A | 9/2013 |
| JP | 2016149361 | A | 8/2016 |
| JP | 2017079151 | A | 4/2017 |

OTHER PUBLICATIONS

Search Report from the Intellectual Property Office of France dated Jul. 4, 2022, corresponding to Application No. FR2206738, 9 pages.

* cited by examiner

CONNECTOR REAR COVER, CONNECTOR SYSTEM, AND ASSEMBLY METHOD

CROSS-REFERENCE TO RELATED APPLICATIONS

This application claims the benefit of the filing date under 35 U.S.C. § 119(a)-(d) of French Patent Application No. 2206738, filed on Jul. 4, 2022.

FIELD OF THE INVENTION

The present disclosure relates to a connector rear cover, a connector system, and an assembly method.

BACKGROUND

An example of a known connector rear cover is shown in FIGS. 1A to 1D. With reference to FIG. 1A, the connector rear cover 101 comprises openings 129 in its rear wall 139. The openings 129 are configured to receive electrical conductors 31, as shown in FIG. 1B. For assembling a connector system comprising a connector housing 35, the connector rear cover 101, and the electrical conductors 31, the terminals of the electrical conductors 31 first are put through the openings 129 in the rear wall 139 of the connector rear cover 101. Subsequently, the terminals of the electrical conductors 31 are crimped, as shown in FIG. 1B. Finally, the crimped terminals of the electrical conductors 31 are inserted into the connector housing 35 and the connector rear cover 101 is fixed to the connector housing via locking device 147, as shown in FIG. 1D.

In order to seal the connector housing 35 against environmental conditions such as moisture, the openings 129 in the rear wall 139 of the connector rear cover 101 are dimensioned to minimize the gap between the electrical conductors 31 and the connector rear cover 101. As shown in FIG. 1C, the crimped terminals of the electrical conductors 31 have a larger diameter than the electrical conductors 31 alone, and therefore the crimped terminals of the electrical conductors 31 do not fit through the openings 129 in the connector rear cover 101. As a consequence, the terminals of the electrical conductors 31 must always first be put through the openings 129 in the rear wall 139 of the connector rear cover 101 and subsequently, the terminals of the electrical conductors 31 are crimped. This means that, during the crimping process, the connector rear cover 101 is already installed, which reduces the flexibility and impedes automated crimping. Moreover, the connector rear cover 101 cannot be easily removed once the terminals of the electrical conductors 31 are crimped. Consequently, there is still a need for a connector rear cover which allows for easy installation and has improved cable routing and sealing capabilities.

SUMMARY

A connector rear cover includes a middle portion having a first edge and a second edge, a first lateral portion having a first lateral edge, and a second lateral portion having a second lateral edge. The first lateral portion is connected to the middle portion by a first hinge and the second lateral portion is connected to the middle portion by a second hinge so that the connector rear cover is foldable between an open and a closed state. The first edge of the middle portion faces the first lateral edge of the first lateral portion and the second edge of the middle portion faces the second lateral edge of the second lateral portion. The edges have recesses such that, in the closed state, there are openings between the middle portion and the first lateral portion and between the middle portion and the second lateral portion that receive electric conductors.

BRIEF DESCRIPTION OF THE DRAWINGS

The invention will be described in more detail in the following with reference to exemplary embodiments illustrated in the drawings, in which.

DETAILED DESCRIPTION OF THE EMBODIMENT(S)

The accompanying drawings are incorporated into the specification and form a part of the specification to illustrate several embodiments of the present disclosure. These drawings, together with the description, explain the principles of the disclosure. The drawings are merely for the purpose of illustrating examples of how the disclosure can be made and used, and are not to be construed as limiting the disclosure to only the illustrated and described embodiments. Furthermore, several aspects of the embodiments may form—individually or in different combinations—solutions according to the present disclosure. The following described embodiments thus can be considered either alone or in an arbitrary combination thereof. Further features and advantages will become apparent from the following more particular description of the various embodiments of the disclosure, as illustrated in the accompanying drawings, in which like references refer to like elements.

Figure 1A:
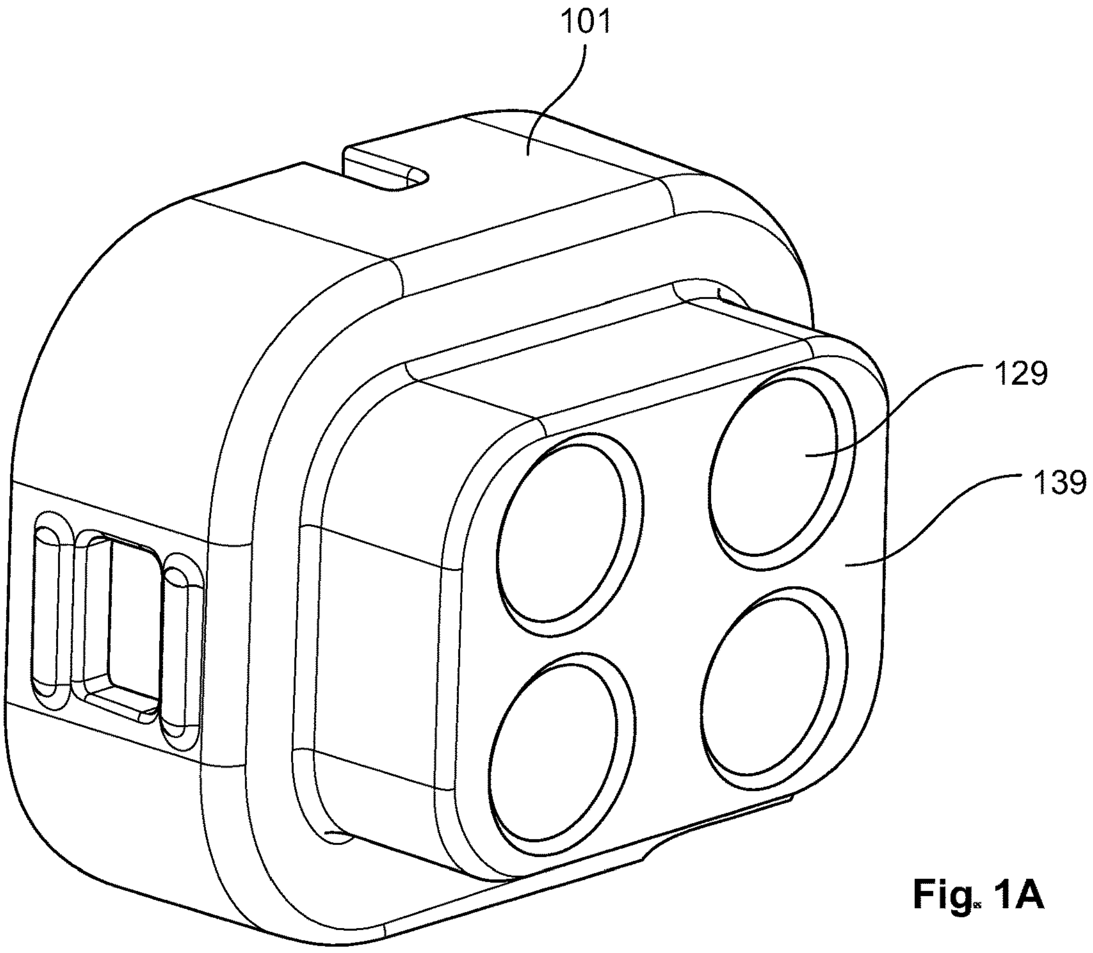
FIG. 1A is a perspective view of a known connector rear cover.
Figure 1B:
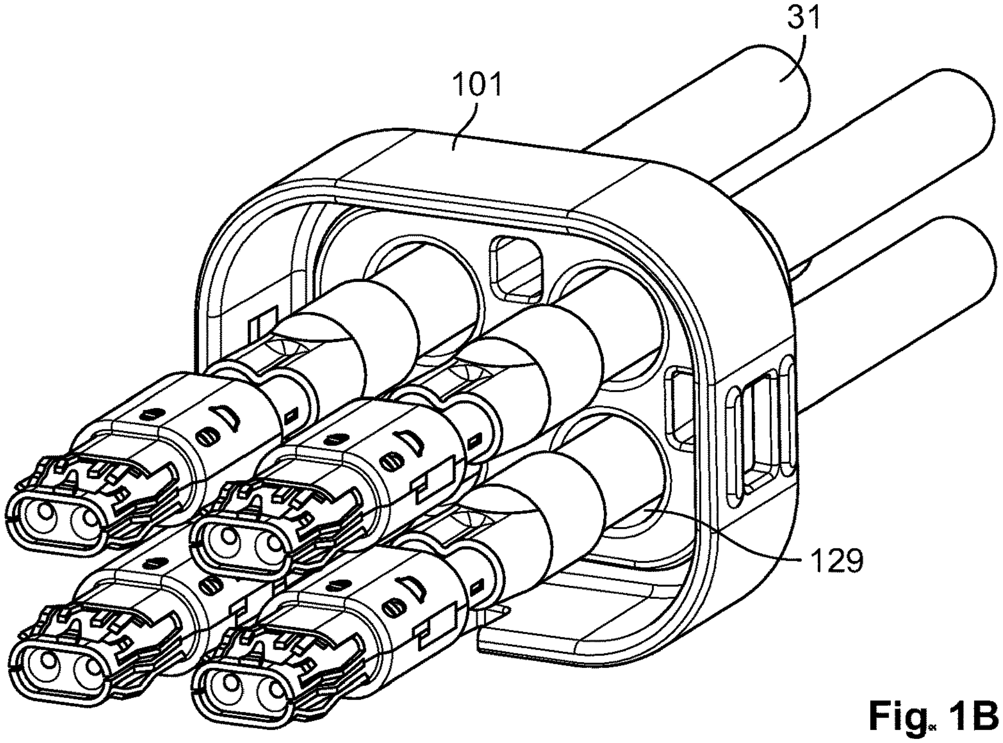
FIG. 1B is a perspective view of a known connector rear cover with electrical conductors.
Figure 1C:
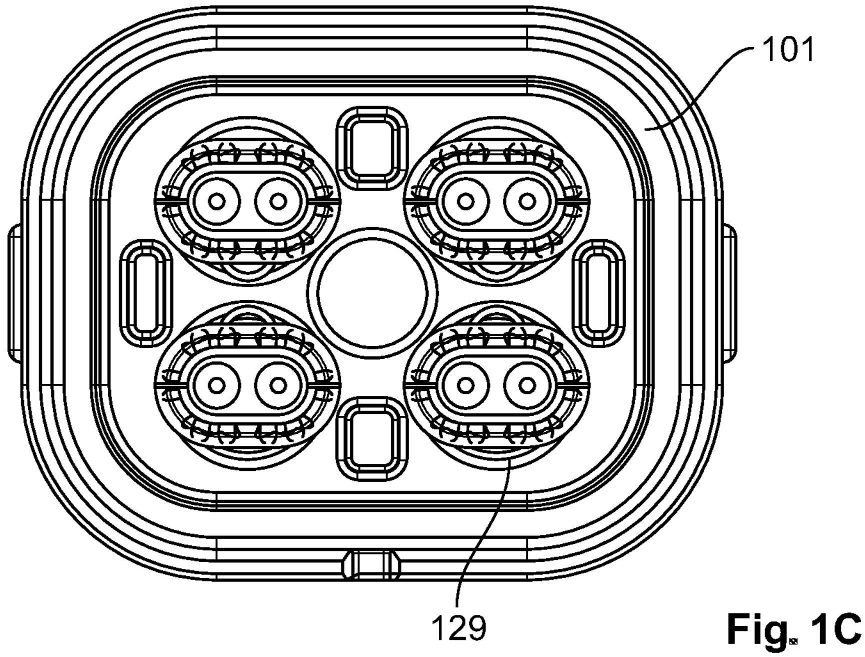
FIG. 1C is a perspective view of a known connector rear cover with electrical conductors.
Figure 1D:
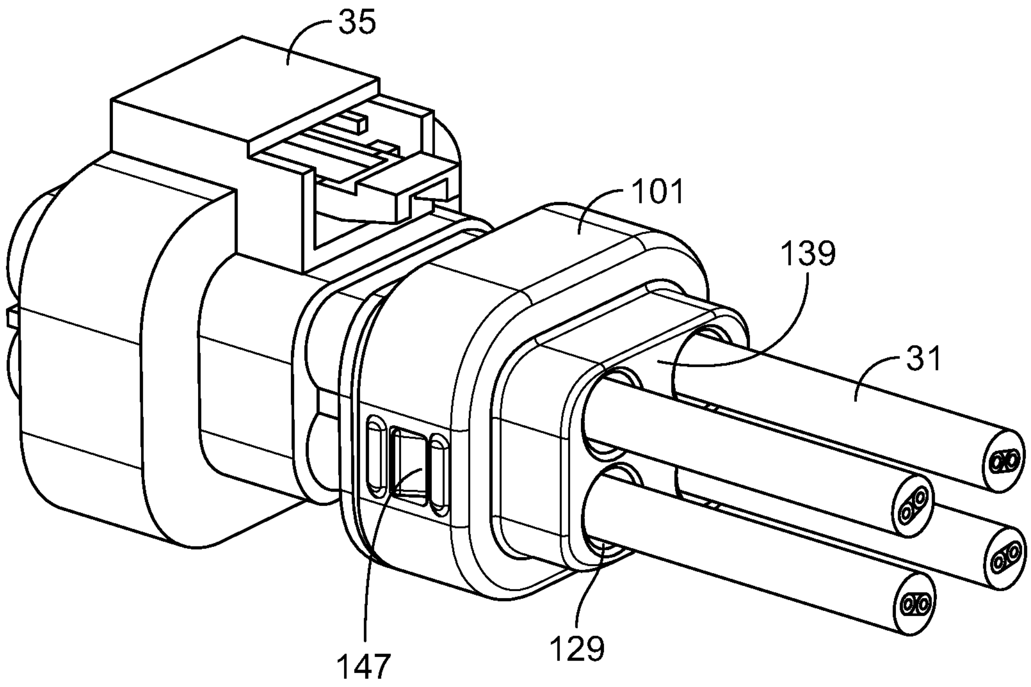
FIG. 1D is a perspective view of a known connector rear cover with a connector housing and electrical conductors.
Figure 2A:
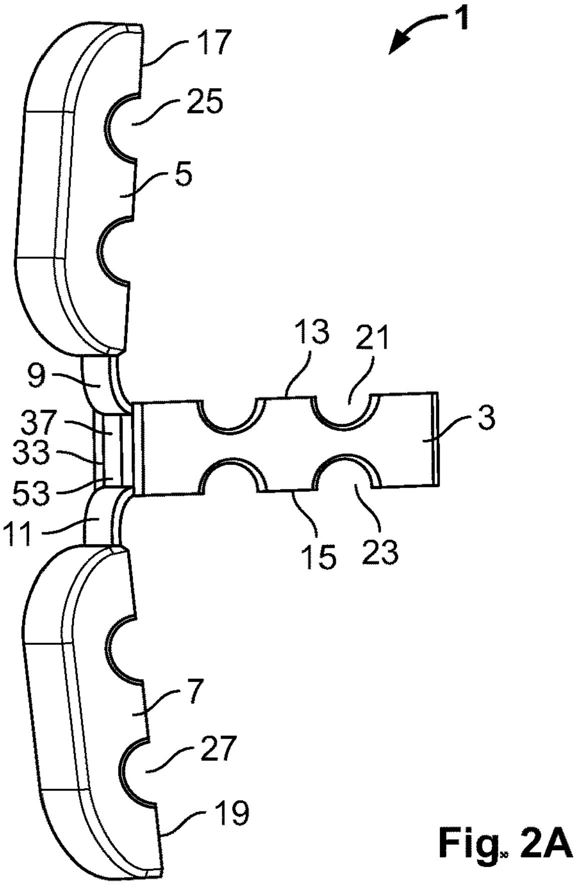
FIG. 2A is a perspective view of a connector rear cover according to the present disclosure in the open state.
Figure 2B:
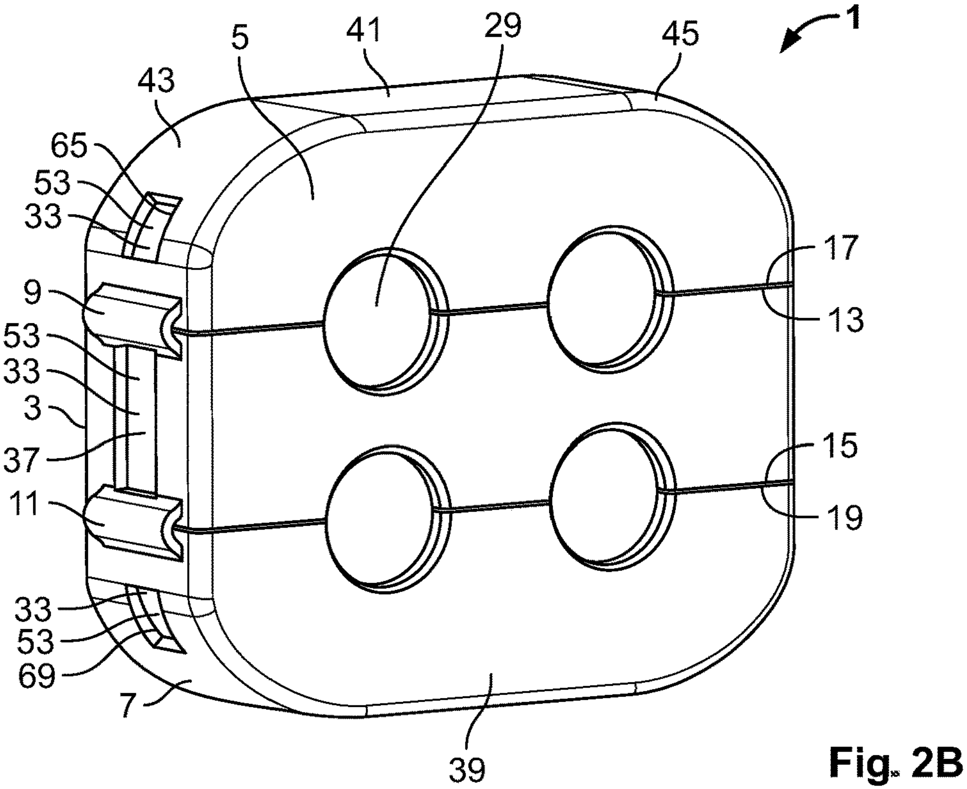
FIG. 2B is a perspective view of a connector rear cover according to the present disclosure in the closed state.

The present disclosure will now be explained in more detail with reference to the Figures and firstly referring to FIG. 2A. FIG. 2A is a perspective view of a connector rear cover 1 according to the present disclosure. The connector rear cover 1 comprises a middle portion 3 having a first edge 13 and a second edge 15, a first lateral portion 5 having a first lateral edge 17, and a second lateral portion 7 having a second lateral edge 19. The first lateral portion 5 is connected to the middle portion 3 by a first hinge 9 and the second lateral portion 7 is connected to the middle portion 3 by a second hinge 11 so that the connector rear cover 1 is foldable between an open and a closed state. FIG. 2A shows the connector rear cover 1 in the open state. FIG. 2B shows the connector rear cover 1 in the closed state. In the closed state, the first edge 13 of the middle portion 3 faces the first lateral edge 17 of the first lateral portion 5 and the second edge 15 of the middle portion 3 faces the second lateral edge 19 of the second lateral portion 5.

As shown in FIG. 2A, the middle portion 3 comprises at least one recess 21 which is located at the first edge 13 of the middle portion 3 and at least one recess 23 which is located at the second edge 15 of the middle portion 3. Moreover, the first lateral portion 5 comprises at least one recess 25 located at the first lateral edge 17 of the first lateral portion 5 and the second lateral portion 7 comprises at least one recess 27 located at the second lateral edge 19 of the second lateral portion 7. In the example shown in FIGS. 2A and 2B, the middle portion 3 comprises two recesses 21 which are located at the first edge 13 of the middle portion 3 and two recesses 23 which are located at the second edge 15 of the middle portion 3. In this example, the first lateral portion 5 comprises two recesses 25 located at the first lateral edge 17 of the first lateral portion 5 and the second lateral portion 7 comprises two recesses 27 located at the second lateral edge 19 of the second lateral portion 7.

As shown in FIG. 2B, the recesses 21, 23 at the edges 13, 15 of the middle portion 3, the first lateral portion 5, and the second lateral portion 7 are arranged such that for each recess 21, 23 located at the first or the second edge 15 of the middle portion 3 there is exactly one recess 25, 27 located at the first lateral edge 17 of the first lateral portion 5 or the second lateral edge 19 of the second lateral portion 7, which is positioned such that when the connector rear cover 1 is in the closed state, the two recesses form an opening 29 in the connector rear cover 1. Moreover, for each recess 25, 27 located at the first lateral edge 17 of the first lateral portion 5 or the second lateral edge 19 of the second lateral portion 7 there is exactly one recess 21, 23 located at the first or the second edge 15 of the middle portion 3, which is positioned such that when the connector rear cover 1 is in the closed state, the two recesses form an opening 29 in the connector rear cover 1. This means that there is a one-to-one-correspondence of the recesses 21, 23 at the edges 13, 15 of the middle portion 3 on the one hand and the recesses 25, 27 located at the first lateral edge 17 of the first lateral portion 5 and the second lateral edge 19 of the second lateral portion 7, respectively.

In the example shown in FIGS. 2A and 2B, the two recesses 21 which are located at the first edge 13 of the middle portion 3 and the two recesses 25 which are located at the first lateral edge 17 of the first lateral portion 5 form two openings 29, and the two recesses 23 which are located at the second edge 15 of the middle portion 3 and the two recesses 27 which are located at the second lateral edge 19 of the second lateral portion 7 form two openings 29. Hence, in this example the connector rear cover 1 comprises four openings 29 in the closed state.

As shown in FIG. 2B, each opening 29 in the rear connector cover 1 is formed by two corresponding recesses in such a way that the opening 29 is enclosed by the edges of the two recesses in the closed state. This means that in the closed state, the edge of the opening 29 is closed and any two openings 29 are separated from one another.

Moreover, each of the openings 29 in the connector rear cover 1 is configured to receive an electrical conductor 31. Since in the closed state, the edge of the opening 29 is closed and any two openings 29 are separated from one another, a circumference of an electrical conductor 31 received by the opening 29 is wholly enveloped by the edge of the opening 29. Further, each electrical conductor 31 received by an opening 29 is enveloped individually by the edge of the opening 29, i.e. any two electrical conductors 31 received by different openings 29 are separated from one another. This has the advantage that in the closed state, there is no spacing between the electrical conductor 31 and the connector rear cover 1 or between two electrical conductors 31. Hence, the connector rear cover 1 can be used for sealing a connector housing 35 against environmental conditions such as moisture.

As shown in FIG. 2B, the connector rear cover 1 in the closed state comprises a rear wall 39 and four side walls 41. The four side walls 41 are essentially transversal to the rear wall 39. The openings 29 are located in the rear wall 39 of the connector rear cover 1. The first hinge 9 and the second hinge 11 are arranged at the side walls 41 of the connector rear cover 1. In the example shown in FIG. 2B, the first hinge 9 and the second hinge 11 are arranged at the same side wall 41 of the connector rear cover 1. Moreover, in the example shown in FIG. 2B, an axis of rotation of the first hinge 9 extends along an axis of rotation of the second hinge 11, i.e. the axis of rotation of the first hinge 9 and the axis of rotation of the second hinge 11 are essentially parallel.

As shown in FIG. 2B, the side walls 41 of the connector rear cover 1 are interconnected by corner ridges 43 which can be rounded. The rounded corner ridges 43 have the advantage that the connector rear cover 1 can be easily folded from the open to the closed state by rotating the first lateral portion 5 around the axis of rotation of the first hinge 9 and by rotating the second lateral portion 7 around the axis of rotation of the second hinge 11 to enclose an object with a corresponding shape comprising rounded corner ridges. If the object and the side walls 41 of the connector rear cover 1 had sharp corner ridges, the connector rear cover 1 could not be folded by rotating the first lateral portion 5 around the axis of rotation of the first hinge 9 and by rotating the second lateral portion 7 around the axis of rotation of the second hinge 11.

Moreover, the rear wall 39 and the side walls 41 of the connector rear cover 1 are interconnected by sections 45 which can be chamfered. This has the advantage of preventing injuries due to sharp edges.

As shown in FIGS. 2A and 2B, each of the middle portion 3, the first lateral portion 5, and the second lateral portion 7 of the connector rear cover 1 comprises a fixing device 33 configured to establish a form fit connection with a connector housing 35. In the example shown in FIGS. 2A and 2B, the fixing device 33 is located at the side walls 41 of the connector rear cover 1. In this example, the fixing device 33 comprises slots 53 in the side walls of the middle portion 3, the first lateral portion 5, and the second lateral portion 7 of the connector rear cover 1. These slots may include a traversing hole 37 in the side wall 41 of the middle portion 3 between the first hinge 9 and the second hinge 11 and another traversing hole 51 (shown in FIG. 3A) in the side wall 41 of the middle portion 3 opposite to the side wall 41 which comprises the first hinge 9 and the second hinge 11.

Moreover, the first lateral portion 5 may comprise a hole 65 (shown in FIG. 2B) in the rounded corner ridge 43 next to the hinge 9 and a hole 67 (shown in FIG. 6B) in the rounded corner ridge 43 opposite to the hinge 9. Correspondingly, the second lateral portion 7 may comprise a hole 69 (shown in FIG. 2B) in the rounded corner ridge 43 next to the hinge 11 and a hole 71 (not shown) in the rounded corner ridge 43 opposite to the hinge 11.

The fixing device 33 is configured such that a form fit connection with a connector housing 35, in which the connector rear cover 1 is fixed to the connector housing 35 in the closed state, can be established, but the connector rear cover 1 cannot be fixed in the closed state without being fixed to a connector housing 35. To that end, the fixing device 33 is configured such that they do not engage with one another. This has the advantage that the connector rear cover 1 does not accidentally lock in the closed state before the installation.

Figure 3A:
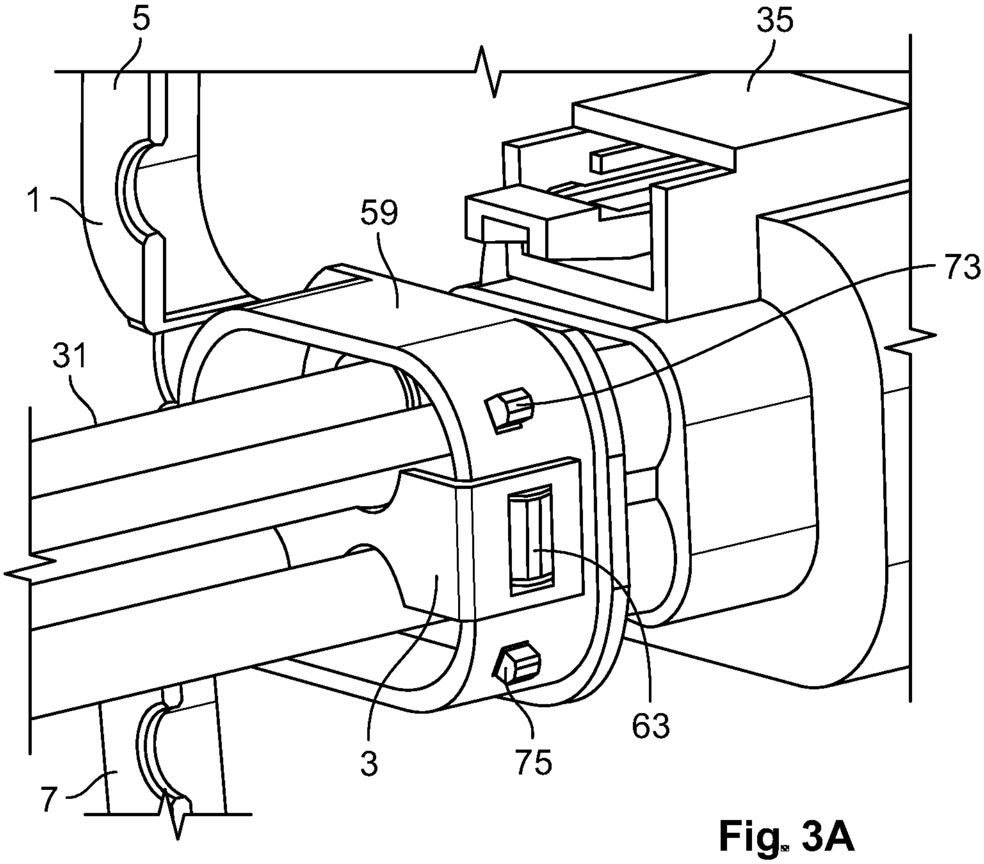
FIG. 3A is a perspective view of a connector system according to the present disclosure with the connector rear cover in the open state.
Figure 3B:
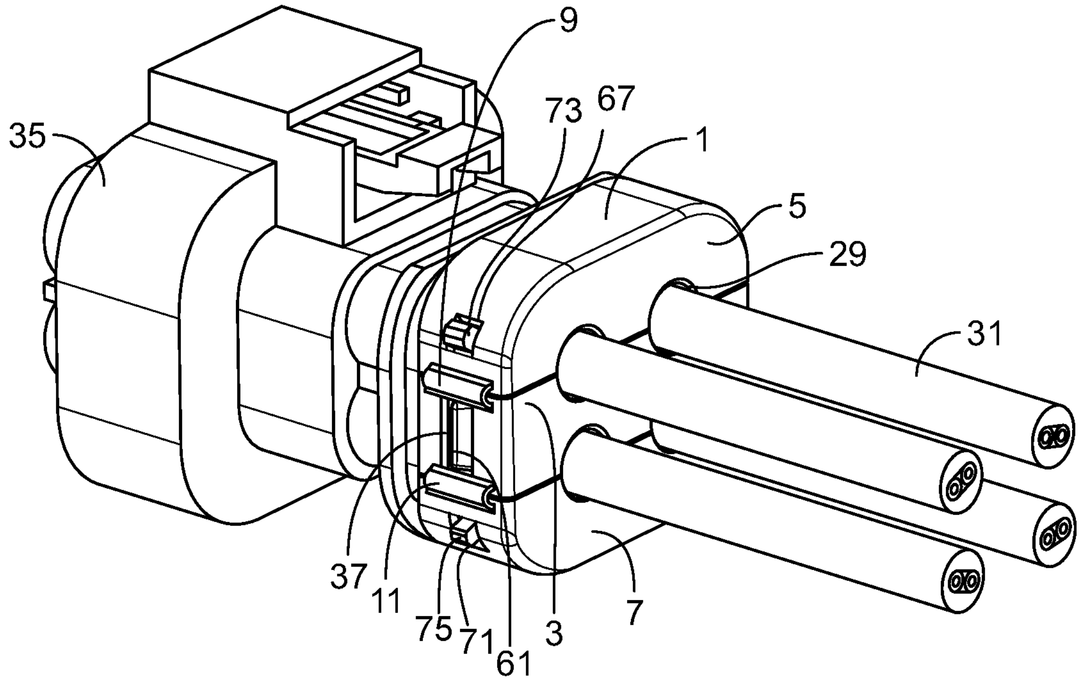
FIG. 3B is a perspective view of a connector system according to the present disclosure with the connector rear cover in the closed state.

The present disclosure also relates to a connector system. An exemplary embodiment of a connector system according to the present disclosure is shown in FIGS. 3A and 3B. The connector system comprises a connector housing 35 and a connector rear cover 1 according to any of the embodiments described above. FIG. 3A is a perspective view of a connector system according to the present disclosure with the connector rear cover 1 in the open state and FIG. 3B is a perspective view of a connector system according to the present disclosure with the connector rear cover 1 in the closed state.

As shown in FIG. 3A, the connector housing 35 comprises a rear part 59 which has a shape that allows for a form fit connection of the rear part 59 of the connector housing 35 and the connector rear cover 1. The rear part 59 of the connector housing 35 comprises protrusions 61 (shown in FIG. 3B) and 63 (shown in FIG. 3A) at opposite sides of the rear part 59 of the connector housing 35. The protrusions 61 and 63 are located such that they can engage with the traversing holes 37 and 51 in the side walls of the middle part 3 of the connector rear cover 1, respectively. By inserting the protrusions 61 and 63 in the traversing holes 37 and 51 in the side walls of the middle part 3 of the connector rear cover 1, a form fit connection is established between the rear part 59 of the connector housing 35 and the middle part 3 of the connector rear cover 1.

The connector system comprises a locking mechanism 47 for fixing the connector rear cover 1 to the connector housing 35 in the closed state. The locking mechanism 47 for fixing the connector rear cover 1 to the connector housing 35 in the closed state may comprise a snap fit 49. As shown in FIG. 3A, the rear part 59 of the connector housing 35 comprises protrusions 73 and 75 which are located such that they can engage with the holes 67 and 71 in the side walls of the first lateral part 5 of the connector rear cover 1 and of the second lateral part 7 of the connector rear cover 1, respectively, as shown in FIG. 3B. By inserting the protrusion 73 in the hole 67 in the side wall of the first lateral part 5 of the connector rear cover 1, a form fit connection is established between the rear part 59 of the connector housing 35 and the first lateral part 5 of the connector rear cover 1. Correspondingly, by inserting the protrusion 75 in the hole 71 in the side wall of the second lateral part 7 of the connector rear cover 1, a form fit connection is established between the rear part 59 of the connector housing 35 and the second lateral part 7 of the connector rear cover 1.

The rear part 59 of the connector housing 35 may comprise additional protrusions and the side walls 41 of the connector rear cover 1 may comprise additional slots which are configured to receive the additional protrusions in order to establish a form fit connection between the rear part 59 of the connector housing 35 and the connector rear cover 1. As shown in FIG. 2B, the additional slots may comprise for example holes 65 and 69 in the side walls of the first lateral part 5 of the connector rear cover 1 and of the second lateral part 7 of the connector rear cover 1, respectively.

Figure 4:
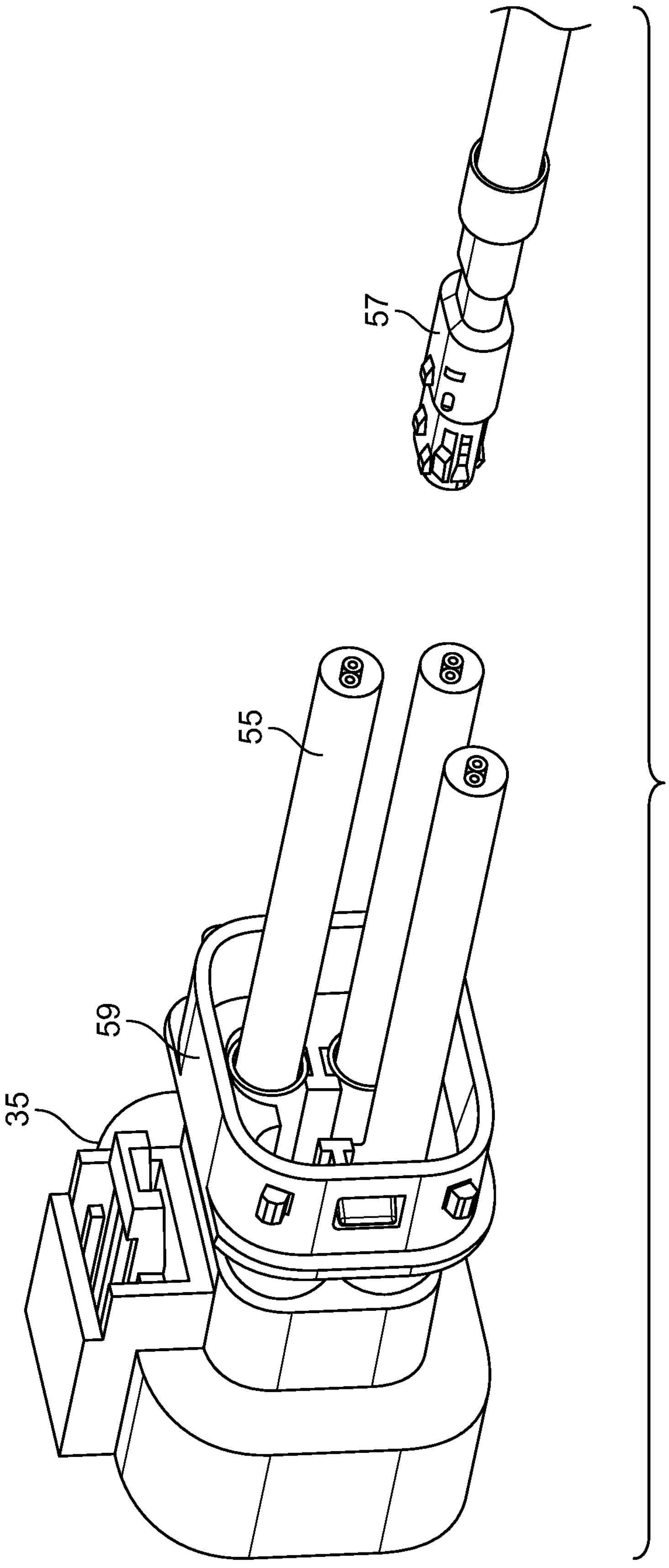
FIG. 4 is a perspective view of a connector cover with electrical conductors.

The present disclosure also relates to a method for assembling a connector system according to any of the embodiments described above. The first method step is illustrated in FIG. 4. In this step, wire terminals 57 are inserted into the connector housing 35. Optionally, the wire terminals 57 may be crimped before inserting them into the connector housing 35. At this stage, the wires 55 are not yet bound together by the connector rear cover 1. The wires 55 can be handled more flexibly, which allows for example for automating the crimping process.

The second and third method steps are illustrated in FIGS. 5A to 5D. In the second method step, the middle portion 3 of the connector rear cover 1 is inserted between the wires 55. As shown for example in FIG. 5A, the middle portion 3 of the connector rear cover 1 is placed between the wires 55 in such a way that the wires 55 touch the edges of the middle portion 3 of the connector rear cover 1 at the recesses. In the example shown in FIGS. 5A to 5D, there are four wires 55, two of which touch the first edge 13 of the middle portion 3 of the connector rear cover 1 at the two recesses 21 in the first edge of the middle portion, and the other two of which touch the second edge 15 of the middle portion 3 of the connector rear cover 1 at the two recesses 23 in the second edge of the middle portion 3.

Figure 5A:
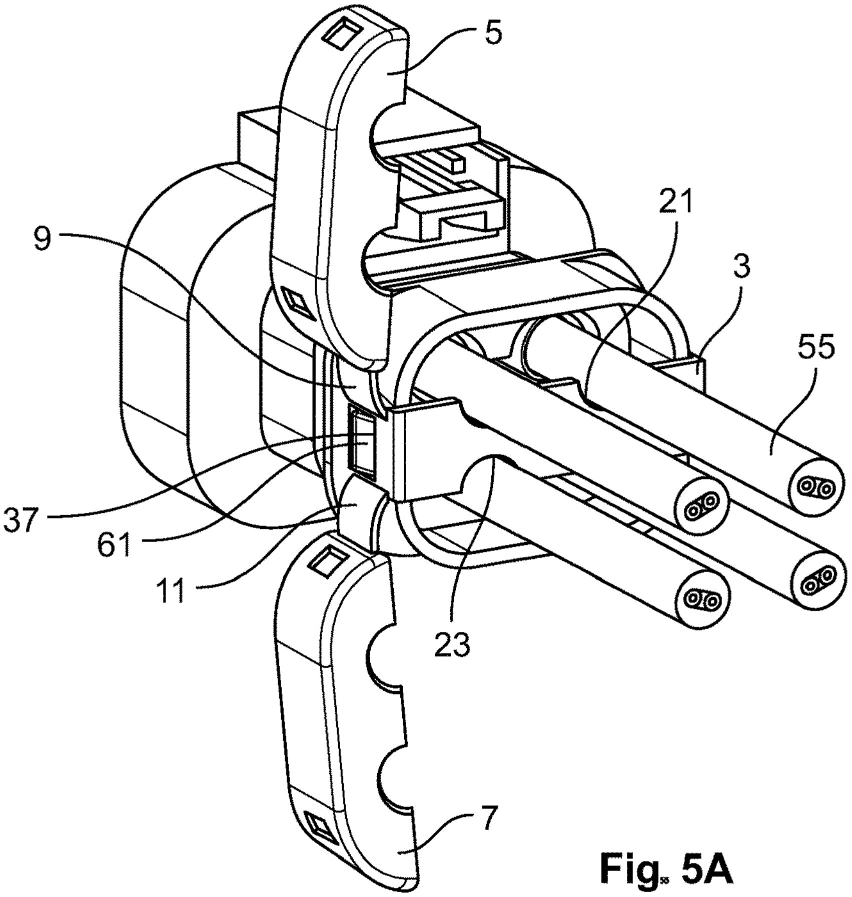
FIG. 5A is a perspective view of a connector system with a connector rear cover in the open state.
Figure 5B:
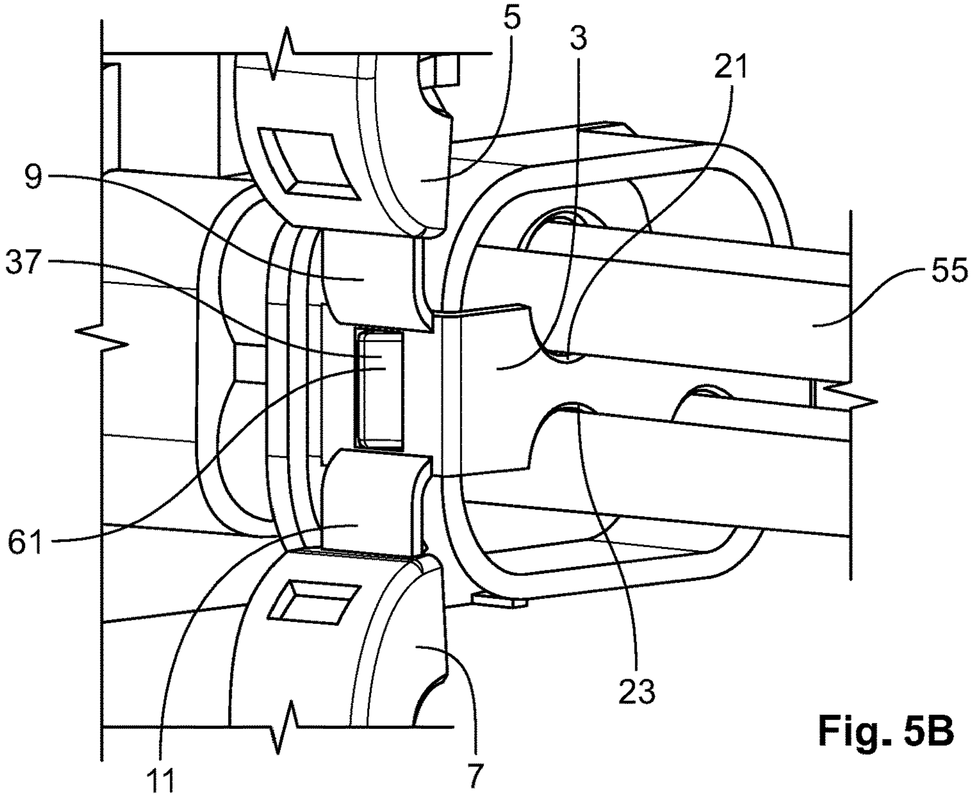
FIG. 5B is a perspective view of a connector system with a connector rear cover in the open state.
Figure 5C:
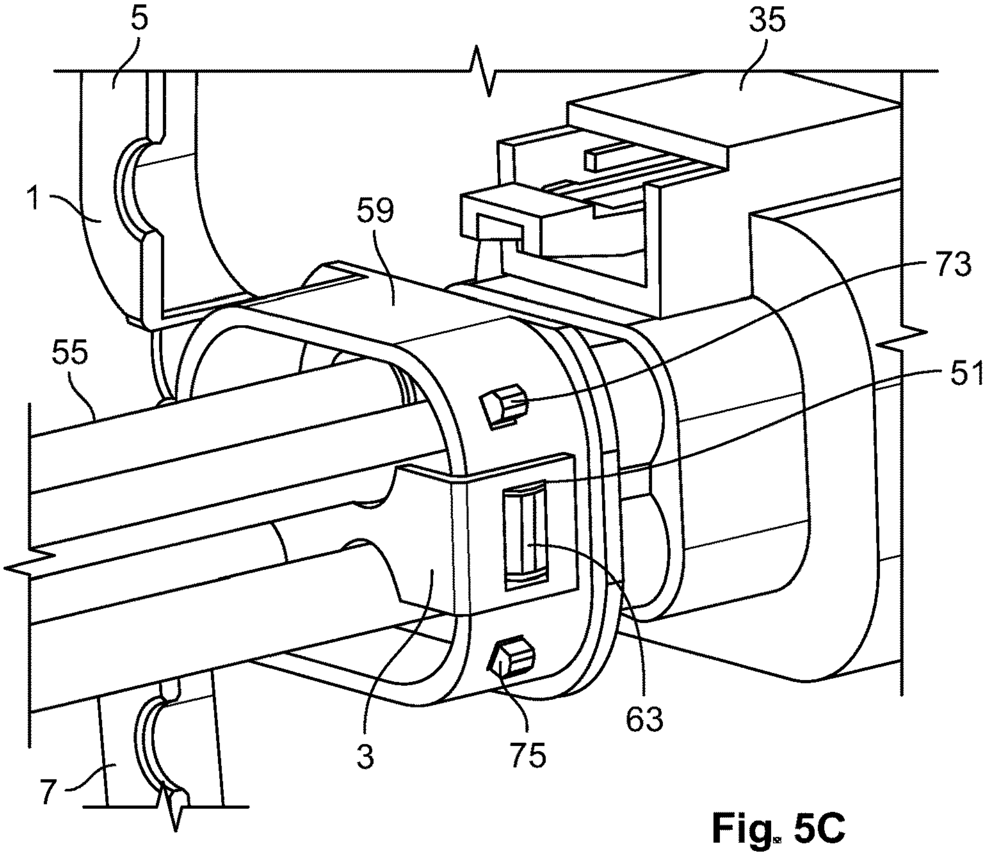
FIG. 5C is a perspective view of a connector system with a connector rear cover in the open state.
Figure 5D:
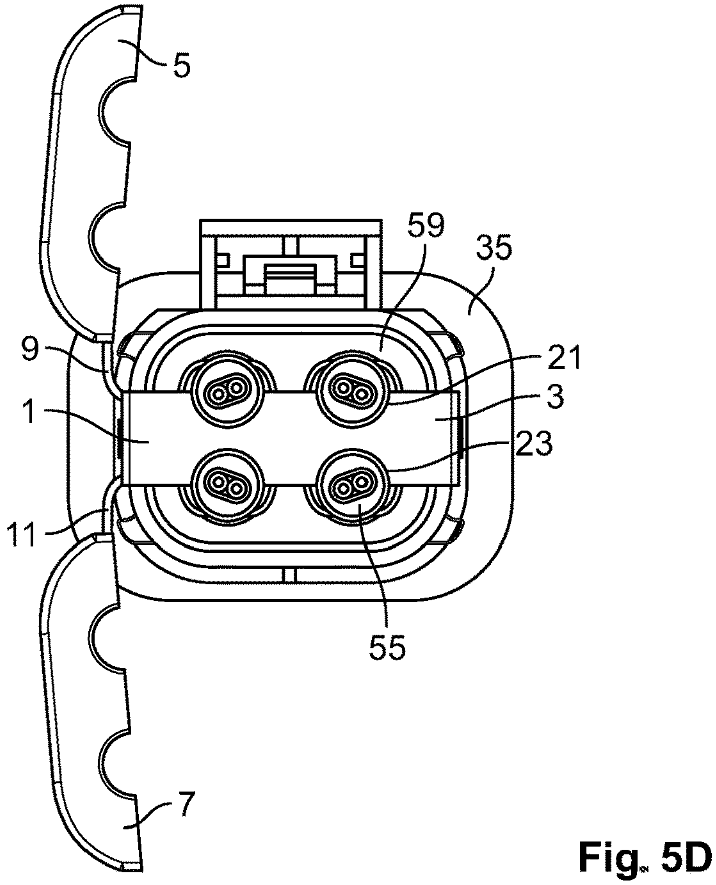
FIG. 5D is a perspective view of a connector system with a connector rear cover in the open state.

In the third method step, the middle part 3 of the connector rear cover 1 is fixed to the connector housing 35 via a locking mechanism 47. Specifically, the protrusion 61 in the rear part 59 of the connector housing 35 is inserted into the traversing hole 37 in the side wall 41 of the middle part 3 of the connector rear cover 1, as shown in FIGS. 5A and 5B, and the protrusion 63 in the rear part 59 of the connector housing 35 is inserted into the traversing hole 51 in the side wall 41 of the middle part 3 of the connector rear cover 1, as shown in FIG. 5C.

Figure 6A:
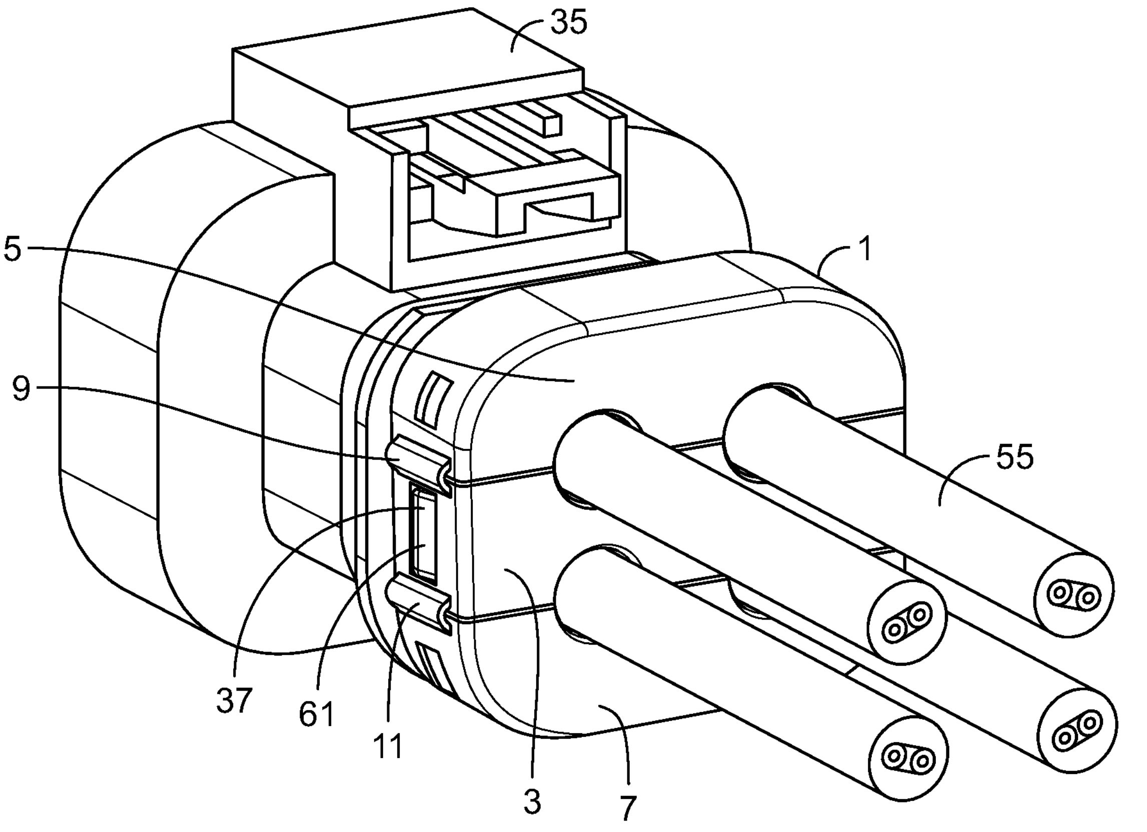
FIG. 6A is a perspective view of a connector system with a connector rear cover in the closed state.
Figure 6B:
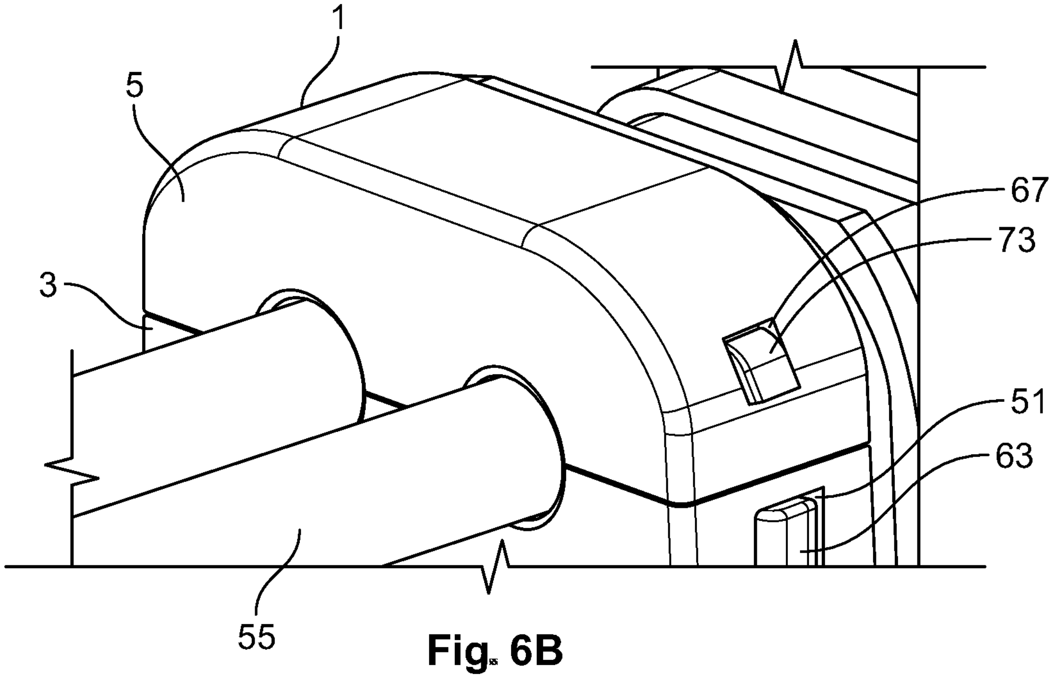
FIG. 6B is a perspective view of a connector system with a connector rear cover in the closed state.

The fourth and fifth method steps are illustrated in FIGS. 6A and 6B. In the fourth method step, the first lateral portion 5 and the second lateral portion 7 of the connector rear cover 1 are folded from the open state to the closed state, thereby bringing in touch the first lateral edge 17 of the first lateral portion 5 with the first edge 13 of the middle portion 3, and the second lateral edge 19 of the second lateral portion 7 with the second edge 15 of the middle portion 3. As shown in FIG. 6A, the first lateral portion 5 and the second lateral portion 7 of the connector rear cover 1 are placed around the wires 55 in such a way that the wires 55 touch the first lateral edge 17 of the first lateral portion 5 and the second lateral edge 19 of the second lateral portion 7 at the recesses. In the example shown in FIGS. 6A and 6B, there are four wires 55, two of which touch the first lateral edge 17 of the first lateral portion 5 of the connector rear cover 1 at the two recesses 21 in the first lateral edge 17 of the first lateral portion 5, and the other two of which touch the second lateral edge 19 of the second lateral portion 7 of the connector rear cover 1 at the two recesses 21 in the second lateral edge 19 of the second lateral portion 7. As shown in FIG. 6A, the recesses form openings 29 which enclose the wires 55 individually.

In the fifth method step, the first lateral portion 5 and the second lateral portion 7 of the connector rear cover 1 are fixed to the connector housing 35 via a locking mechanism 47. Specifically, the protrusion 73 in the rear part 59 of the connector housing 35 is inserted into the hole 67 in the side wall 41 of the first lateral portion 5 of the connector rear cover 1, as shown in FIG. 6B, and the protrusion 75 in the rear part 59 of the connector housing 35 is inserted into the hole 71 in the side wall 41 of the second lateral portion 7 of the connector rear cover 1. Thereby, the connector rear cover 1 is locked in the closed position and fixed to the rear part 59 of the connector housing 35.

The connector rear cover 1 is separate from the corresponding connector housing 35, the connector rear cover 1 comprising three parts 3, 5, 7 which are connected by two hinges 9, 11, which allows for installing and removing the connector rear cover 1 even after the wires 55 are crimped and inserted into the connector. Moreover, the connector rear cover 1 comprises openings 29 which envelope each wire 55 individually, thereby providing improved cable routing and sealing capabilities.

What is claimed is:

1. A connector rear cover, comprising:

a middle portion having a first edge and a second edge, the middle portion has at least one recess at the first edge and at least one recess at the second edge;

a first lateral portion having a first lateral edge, the first lateral portion has at least one recess at the first lateral edge; and a second lateral portion having a second lateral edge, the second lateral portion has at least one recess at the second lateral edge, the first lateral portion is connected to the middle portion by a first hinge and the second lateral portion is connected to the middle portion by a second hinge so that the connector rear cover is foldable between an open state and a closed state, the first edge of the middle portion faces the first lateral edge of the first lateral portion and the second edge of the middle portion faces the second lateral edge of the second lateral portion, the recesses at the first edge, the second edge, the first lateral edge, and the second lateral edge are arranged such that, for each recess at the first edge or the second edge, there is one recess at the first lateral edge or the second lateral edge that is positioned such that when the connector rear cover is in the closed state, the recesses form an opening in the connector rear cover, and for each recess at the first lateral edge or the second lateral edge, there is one recess at the first edge or the second edge that is positioned such that when the connector rear cover is in the closed state, the recesses form an opening in the connector rear cover, the middle portion has a traversing hole in between the first hinge and the second hinge.

2. The connector rear cover of claim 1, wherein the connector rear cover has four openings in the closed state.

3. The connector rear cover of claim 1, wherein each of the openings receives an electrical conductor.

4. The connector rear cover of claim 3, wherein each of the openings wholly envelops a circumference of the electrical conductor when the connector rear cover is in the closed state.

5. The connector rear cover of claim 1, wherein an axis of rotation of the first hinge extends along an axis of rotation of the second hinge.

6. The connector rear cover of claim 1, wherein each of the middle portion, the first lateral portion, and the second lateral portion has a fixing device establishing a form fit connection with a connector housing.

7. The connector rear cover of claim 6, wherein a hole extends into each of the first lateral portion and the second lateral portion, the hole of the first lateral portion is adjacent the first hinge and the hole of the second lateral portion is adjacent the second hinge, the traversing hole is part of the fixing device.

8. The connector rear cover of claim 1, wherein, in the closed state, the connector rear cover has a rear wall and four side walls that are essentially transversal to the rear wall.

9. The connector rear cover of claim 8, wherein the openings are in the rear wall.

10. The connector rear cover of claim 8, wherein the first hinge and the second hinge are arranged at a same side wall of the four side walls of the connector rear cover.

11. The connector rear cover of claim 8, wherein the four side walls are interconnected by a plurality of rounded corner ridges.

12. The connector rear cover of claim 8, wherein the rear wall and the four side walls are interconnected by a plurality of chamfered sections.

13. A connector system, comprising:

a connector housing; and a connector rear cover including:

a middle portion having a first edge and a second edge, the middle portion has at least one recess at the first edge and at least one recess at the second edge;

a first lateral portion having a first lateral edge, the first lateral portion has at least one recess at the first lateral edge; and a second lateral portion having a second lateral edge, the second lateral portion has at least one recess at the second lateral edge, the first lateral portion is connected to the middle portion by a first hinge and the second lateral portion is connected to the middle portion by a second hinge so that the connector rear cover is foldable between an open state and a closed state, the first edge of the middle portion faces the first lateral edge of the first lateral portion and the second edge of the middle portion faces the second lateral edge of the second lateral portion, the recesses at the first edge, the second edge, the first lateral edge, and the second lateral edge are arranged such that, for each recess at the first edge or the second edge, there is one recess at the first lateral edge or the second lateral edge that is positioned such that when the connector rear cover is in the closed state, the recesses form an opening in the connector rear cover, and for each recess at the first lateral edge or the second lateral edge, there is one recess at the first edge or the second edge that is positioned such that when the connector rear cover is in the closed state, the recesses form an opening in the connector rear cover, the middle portion has a traversing hole is in between the first hinge and the second hinge.

14. The connector system of claim 13, further comprising a locking mechanism fixing the connector rear cover to the connector housing in the closed state.

15. The connector system of claim 14, wherein the locking mechanism fixing the connector rear cover to the connector housing in the closed state has a snap fit.

16. The connector rear cover of claim 13, wherein a rear part of the connecter housing has a plurality of protrusions, and a hole extends into each of the first lateral portion and the second lateral portion, the hole of the first lateral portion is adjacent the first hinge and the hole of the second lateral portion is adjacent the second hinge, each protrusion is inserted into one hole.

17. The connector system of claim 13, wherein a rear part of the connector housing has a protrusion, the protrusion engages with the traversing hole.

18. A method for assembling a connector system, comprising:

providing a connector housing and a connector rear cover, the connector rear cover including:

a middle portion having a first edge and a second edge, the middle portion has at least one recess at the first edge and at least one recess at the second edge;

a first lateral portion having a first lateral edge, the first lateral portion has at least one recess at the first lateral edge; and a second lateral portion having a second lateral edge, the second lateral portion has at least one recess at the second lateral edge, the first lateral portion is connected to the middle portion by a first hinge and the second lateral portion is connected to the middle portion by a second hinge so that the connector rear cover is foldable between an open state and a closed state, the first edge of the middle portion faces the first lateral edge of the first lateral portion and the second edge of the middle portion faces the second lateral edge of the second lateral portion, the recesses at the first edge, the second edge, the first lateral edge, and the second lateral edge are arranged such that, for each recess at the first edge or the second edge, there is one recess at the first lateral edge or the second lateral edge that is positioned such that when the connector rear cover is in the closed state, the recesses form an opening in the connector rear cover, and for each recess at the first lateral edge or the second lateral edge, there is one recess at the first edge or the second edge that is positioned such that when the connector rear cover is in the closed state, the recesses form an opening in the connector rear cover, the middle portion has a traversing hole is in between the first hinge and the second hinge;

inserting a plurality of terminals of a plurality of wires into the connector housing;

inserting the middle portion of the connector rear cover between the wires;

fixing the middle portion of the connector rear cover to the connector housing via a locking mechanism;

closing the first lateral portion and the second lateral portion of the connector rear cover; and fixing the first lateral portion and the second lateral portion of the connector rear cover to the connector housing in the closed state via the locking mechanism.

19. The method of claim 18, further comprising crimping the terminals to the wires.

20. The method of claim 19, further comprising inserting the crimped terminals on the wires into the connector housing.

* * * * *